US008922077B2

(12) United States Patent
Miyasaka et al.

(10) Patent No.: US 8,922,077 B2
(45) Date of Patent: Dec. 30, 2014

(54) OUTER ROTOR-TYPE MOTOR (75) Inventors: Takeshi Miyasaka, Nagano (JP);
Hiroaki Usui, Nagano (JP)

(73) Assignee: Shinano Kenshi Kabushiki Kaisha, Nagano (JP)

(*) Notice: Subject to any disclaimer, the term of this patent is extended or adjusted under 35 U.S.C. 154(b) by 318 days.

(21) Appl. No.: 13/454,509

(22) Filed: Apr. 24, 2012

(65) Prior Publication Data
US 2013/0002068 A1 Jan. 3, 2013

(30) Foreign Application Priority Data

Jun. 29, 2011 (JP) ................. 2011-143691

(51) Int. Cl.
*H02K 16/00* (2006.01)
*H02K 1/14* (2006.01)
*H02K 3/52* (2006.01)
*H02K 37/12* (2006.01)

(52) U.S. Cl.
CPC ............... *H02K 1/145* (2013.01); *H02K 3/525* (2013.01); *H02K 37/12* (2013.01)
USPC .......................................................... 310/71

(58) Field of Classification Search
CPC .......... H02K 5/225; H02K 3/522; H02K 3/50
USPC ......................................................... 310/71
See application file for complete search history.

(56) References Cited

U.S. PATENT DOCUMENTS

| | | | | |
|---|---|---|---|---|
| 3,508,091 A * | 4/1970 | Kavanaugh | ................ | 310/49.11 |
| 4,720,646 A * | 1/1988 | Torimoto | ....................... | 310/71 |
| 4,990,806 A * | 2/1991 | Kikuchi et al. | ........... | 310/49.11 |
| 5,691,583 A * | 11/1997 | Suzuki et al. | .............. | 310/49.13 |
| 7,071,593 B2 * | 7/2006 | Matsushita et al. | ........... | 310/257 |
| 7,449,805 B2 * | 11/2008 | Bin | ........................... | 310/49.14 |
| 7,898,123 B2 * | 3/2011 | Usui | .......................... | 310/49.01 |
| 2004/0041495 A1 * | 3/2004 | Suzuki et al. | ................ | 310/259 |
| 2006/0103243 A1 * | 5/2006 | Ogawa | ....................... | 310/49 R |

(Continued)

FOREIGN PATENT DOCUMENTS

| | | | |
|---|---|---|---|
| DE | 102007016652 A1 * | 10/2008 | ............. H02K 37/14 |
| JP | 61-258662 A | 11/1986 | |

(Continued)

OTHER PUBLICATIONS

Office Action dated Jun. 4, 2013, issued in corresponding Japanese Application No. 2011-143691.

*Primary Examiner* — Alex W Mok
(74) *Attorney, Agent, or Firm* — Westerman, Hattori, Daniels & Adrian, LLP (57) ABSTRACT

In the outer rotor-type motor, coil leads can be efficiently wired in small spaces of stator units. The outer rotor-type motor comprises: a stator being constituted by a plurality of the stator units, in each of which a coil is sandwiched between stator yokes having magnetic pole teeth; a rotor having a rotor yoke, which includes a permanent magnet and which is capable of rotating together with an output shaft; and lead terminals of a driving circuit for energizing the coils. Each of the stator yokes is constituted by a plurality of yoke parts and formed into a ring shape, the stator yokes surround outer circumferences of the coils, and coil leads are extended outward from the inner side of each of the coils via a gap between the outer circumference of the coil and the magnetic pole teeth.

7 Claims, 8 Drawing Sheets

(56) References Cited

U.S. PATENT DOCUMENTS

| | | |
|---|---|---|
| 2006/0213467 A1* | 9/2006 | Froeschle et al. ......... 123/90.11 |
| 2007/0035197 A1* | 2/2007 | Usui ............................. 310/257 |
| 2007/0145834 A1* | 6/2007 | Usui ........................... 310/49 R |
| 2007/0145854 A1* | 6/2007 | Enomoto et al. .............. 310/257 |
| 2007/0278894 A1* | 12/2007 | Masaki et al. ................ 310/257 |
| 2008/0067880 A1* | 3/2008 | Usui et al. ................... 310/49 R |
| 2008/0069686 A1* | 3/2008 | Masaki et al. ............. 415/121.2 |
| 2008/0079322 A1* | 4/2008 | Kanazawa et al. .............. 310/44 |
| 2008/0136272 A1* | 6/2008 | Ishikawa et al. ................ 310/58 |
| 2008/0252181 A1* | 10/2008 | Suzuki et al. ............... 310/49 R |
| 2010/0219711 A1* | 9/2010 | Gruendl et al. ......... 310/156.25 |
| 2011/0163641 A1* | 7/2011 | Koyama et al. ............. 310/67 R |

FOREIGN PATENT DOCUMENTS

| | | |
|---|---|---|
| JP | 62-141955 A | 6/1987 |
| JP | 4-131181 U | 12/1992 |
| JP | 2002-078268 A | 3/2002 |
| JP | 2005-110377 A | 4/2005 |
| JP | 2007-049844 A | 2/2007 |
| JP | 2010-11589 A | 1/2010 |
| WO | WO 2011076579 A1 * | 6/2011 |
| WO | WO 2011080294 A2 * | 7/2011 |

* cited by examiner

OUTER ROTOR-TYPE MOTOR

This application is based upon and claims the benefit of priority of the prior Japanese Patent Application No. P2011-143691, filed on Jun. 29, 2011 and the entire contents of which are incorporated herein by reference.

FIELD

The present invention relates to an outer rotor-type motor, which is used in, for example, vehicles, industrial equipments, office equipments, etc.

BACKGROUND

In a motor, a direction of an electric current passing through a coil of each of coil units is switched, so that a rotor having a permanent magnet, which faces magnetic pole teeth of stator yokes, can be rotated. The coils are electrically connected to a motor circuit board so as to control the current direction passing through the coils, etc. For example, in an ordinary brushless motor, a magnet wire is wound, on an iron core of a stator, in a direction parallel to an output shaft (i.e., an axial direction of the coil is perpendicular to that of the stator), and ends of the magnet wire of the coil are extended, in the axial direction, and connected to a drive circuit.

In a stator unit of an inner rotor-type PM stepping motor, a magnet wire is wound on coil bobbins, each of which is formed around each of magnetic pole teeth of a stator yoke, and an inner end and an outer end of a coil are extended to a space formed on the outer side of the stator and electrically connected to a connector or a printed circuit board by lead terminals (see Japanese Laid-open Patent Publications No. 2002-78268 and No. 2005-110377).

In a stator unit of an outer rotor-type PM stepping motor, a magnet wire is wound on coil bobbins, each of which is provided on the inner side of each of magnetic pole teeth of a stator yoke. A guide section is provided between an inner part of the coil bobbin and an outer circumference of a bearing housing, and coil leads are passed through the guide section, so that ends of a coil can be electrically connected to a connector or a printed circuit board (see Japanese Laid-open Patent Publication No. 2007-49844).

In comparison with the inner rotor-type PM stepping motor, the outer rotor-type PM stepping motor having the same size is capable of generating greater torque. However, the coil leads must be wired in an inner space of the motor, it is difficult to sufficiently secure the inner space for wiring the coil leads. Since the coil leads must be wired in a tight space, wiring efficiency must be lowered and enough insulation reliability between the stator yoke and the coil cannot be secured.

On the other hand, lamination factor of the coil is lowered or cubic volume of the stator yoke constituting a magnetic path is reduced so as to secure enough working space for wiring the coil leads. In this case, performance of the motor must be worsened.

Namely, it is difficult to produce a large torque motor whose structure has high insulation reliability. Further, efficiency of assembling the outer rotor-type PM stepping motor is low, so it is difficult to expand use of said motor.

SUMMARY

Accordingly, it is an object to provide an outer rotor-type motor capable of solving the above described problems of the conventional motors. Namely, in the outer rotor-type motor of the present invention, coil leads can be efficiently wired in small spaces without lowering lamination factors of coils and worsening insulation reliability between stator yokes.

To achieve the object, the present invention has following structures.

Namely, the outer rotor-type motor of the present invention comprises:
a stator being constituted by a plurality of stator units, which are concentrically stacked around a bearing section and in each of which an air-core coil formed by winding a magnet wire is sandwiched between stator yokes having comb-shaped magnetic pole teeth;
an output shaft being pierced through the bearing section;
a rotor having a rotor yoke, which includes a permanent magnet having magnetic poles facing the magnetic pole teeth and which is capable of rotating together with the output shaft; and
lead terminals of a driving circuit for energizing the coils to drive the motor,
each of the stator yokes is formed into a ring shape and constituted by a plurality of yoke parts,
the stator yokes, which are formed by combining the yoke parts, surround outer circumferences of the coils, and
coil leads, which are extended outward from the inner side of each of the coils via a gap between the outer circumference of the coil and the magnetic pole teeth, are electrically connected to the lead terminals.

With the above described structure, the stator units can be attached, by combining the yoke parts to form into the ring shape, after attaching the coils onto the outer circumference of the bearing section. Further, the coil leads, which are extended outward from the inner side of the coil via the gap between the outer circumference of the coil and the magnetic pole teeth, are electrically connected to the lead terminals of the driving circuit, so that attaching the stator yokes of the stator units and wiring the coil leads can be performed easily. Therefore, assembling efficiency can be improved, and the coil leads can be wired in tight spaces without lowering lamination factors of the coils and reducing cubic volumes of the stator yokes.

Preferably, in the present invention, a plurality of stator guide plates, which are formed into a ring shape and insulation-coated, are fitted on an outer circumference of a bearing housing, which is formed into a cylindrical shape and capable of rotatably holding the output shaft, to form a plurality of bobbins in the axial direction,
the coils, which are formed by winding the magnet wires, are respectively attached to the bobbins, and
the coil leads are extended toward outside of the adjacent coils via a wiring space formed from the inner side of each of the stator guide plates to the outer side thereof.

With this structure, the coil leads can be extended through the wiring space formed from the inner side of each of the stator guide plates to the outer side thereof, so that the coil leads can be easily wired.

In the present invention, a plurality of bobbins, each of which is formed by integral molding and constituted by a pair of ring-shaped guide plates whose inner connecting sections are connected to each other, may be fitted, on an outer circumference of a bearing housing and stacked thereon,
the coil formed by winding the magnet wire may be attached to each of the bobbins.

Preferably, in the present invention, each of the stator guide plates includes: a slit having erecting walls, which are continuously formed from the inner side to the outer side; a guide section being located on the radially opposite side to the slit, the guide section being projected in the same direction as the erecting walls are projected; and a notch being formed at the outer end of the guide section, the coil leads are extended outward via a groove, which is formed by overlapping the guide section and the erecting walls of the adjacent stator guide plate, and the coil leads are wired along the outer circumference of the adjacent coil via the notch and the erecting walls.

With this structure, the coil leads, which are extended to the outer circumference of the coil via the groove, can be efficiently wired in a tight space.

Preferably, the grooves of the adjacent stator units are shifted in the circumferential direction.

By shifting the grooves in the circumferential direction, the coil leads extended from the inner side of the coils can be wired, on the outer side of the coils, to the lead terminals of the drive circuit without being tangled.

Preferably, in the present invention, the circumferential ends of the yoke parts contact the erecting walls and the guide section of each of the stator guide plates, the magnetic pole teeth are attached on the outer circumference of the coil in such a way that they are engaged with each other, and the yoke parts are integrated, in the circumferential direction, by welding, bonding or press fit.

With this structure, the yoke parts may be attached for each of the stator units, or the yoke parts may be attached, in an integrated state, to the corresponding stator units. The yokes can be easily attached and positioned with respect to the stator guide plates, so that efficiency of assembling the motor can be improved.

In the present invention, the stator may be entirely molded.

With this structure, even if the motor is used in a severe environment such that vibration is applied to the motor or thermal expansion and thermal contraction are repeated, the coil leads are not shifted and moved toward the rotor so that weather resistance and reliability of the motor can be improved.

In the outer rotor-type motor of the present invention, the coil leads can be efficiently wired, in tight spaces between the stator units, without lowering lamination factors of the coils and worsening insulation reliability between the coils and the lead terminals.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the outer rotor-type motor of the present invention will now be described in detail with reference to the accompanying drawings. In the following embodiments, the outer rotor-type motor is a claw pole-type two-phase stepping motor, and a stator is constituted by a plurality of stator units, which are concentrically stacked and in each of which an air-core coil formed by winding a magnet wire is sandwiched between stator yokes having comb-shaped magnetic pole teeth.

Figure 7:
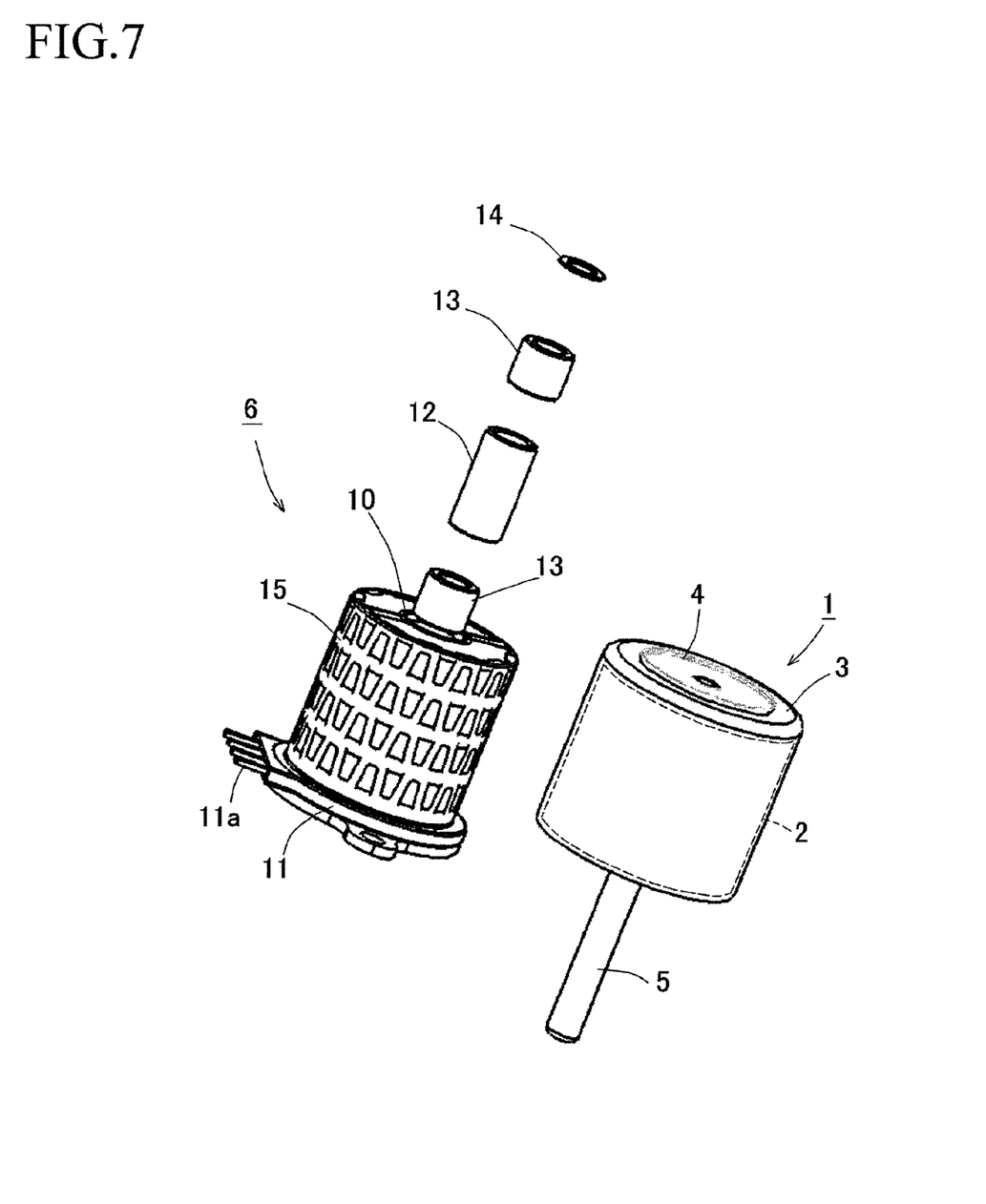
FIG. 7 is an exploded perspective view of the molded stator and a perspective view of a rotor to be attached thereto.

An outline of the two-phase stepping motor will be explained with reference to FIGS. 1 and 7. In FIG. 7, a rotor 1 has a cylindrical rotor yoke 3 and a permanent magnet 2, in which S-poles and N-poles are alternately arranged in the circumferential direction. The permanent magnet 2 is fixed on an inner circumferential face of the rotor yoke 3. The permanent magnet 2 faces magnetic pole teeth (claw poles) of stator yokes (described later). A rotor hub 4 is provided on a bottom face of the rotor yoke 3, and an output shaft 5 is integrated with the rotor hub 4 by, for example, press fit or shrink fit.

Figure 1:
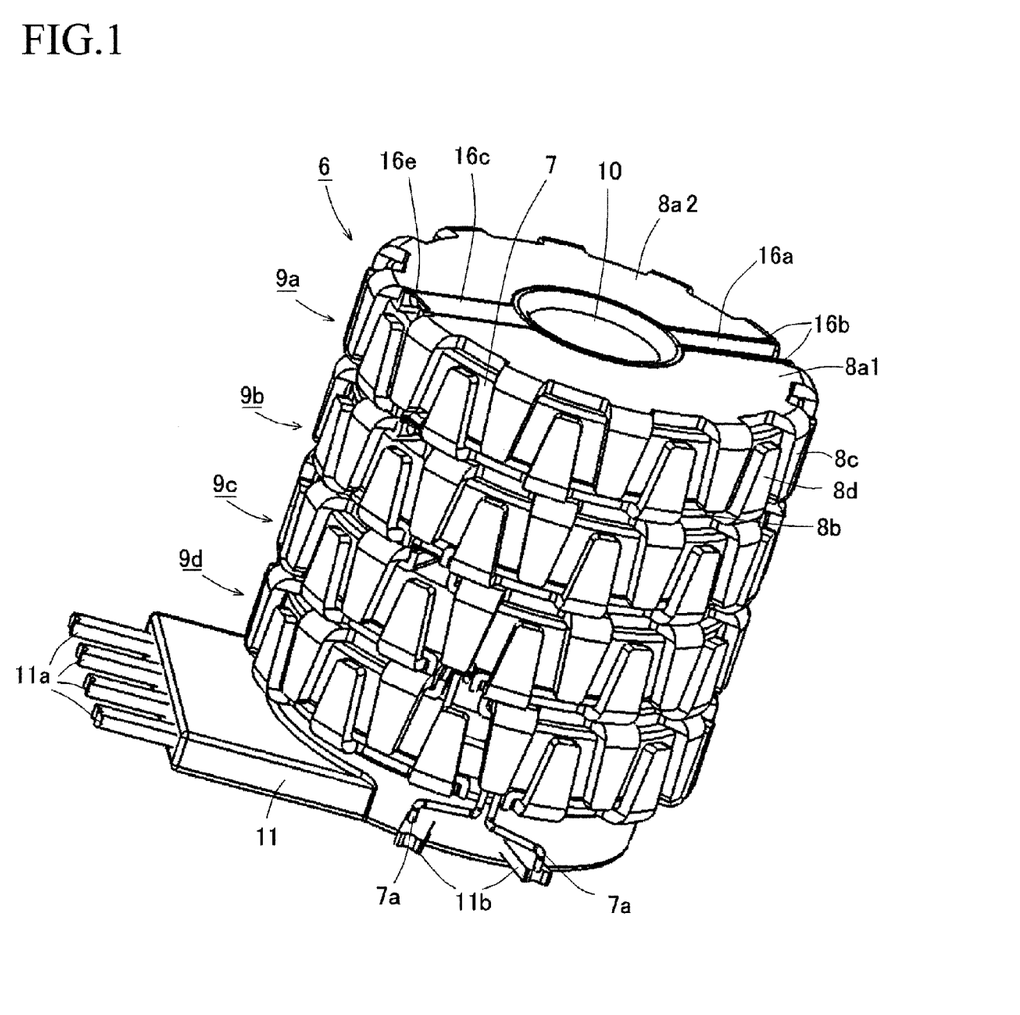
FIG. 1 is a perspective view of a stator unit.

In FIG. 1, a stator 6 is constituted by a plurality of stator units 9a-9d, which are concentrically stacked and in each of which an air-core coil 7 formed by winding a magnet wire is sandwiched between stator yokes 8a and 8b. In the present embodiment, four stator units 9a-9d are stacked. In the two-phase motor of the present embodiment, A-phase coils and B-phase coils are stacked in the form of A-A-B-B, A-B-A-B or A-B-B-A. Note that, the phases of the A-phase coil and the B-phase coil are shifted an electric angle of 180°. As shown in FIG. 7, a cylindrical bearing housing 10, through which the output shaft 5 is pierced, is inserted in the center of the stacked stator units 9a-9d and integrated with a base 11 of a drive circuit. A tubular spacer 12 and a bearing 13 are concentrically fitted in the bearing housing 10, the output shaft 5 of the rotor 1 is pierced through the bearing housing, and a retaining washer 14 retains the output shaft 5 in the bearing housing. In the stator 6, circumferences of the stator units 9a-9d are molded with resin 15. Note that, the magnetic pole teeth 8c and 8d of the stator yokes 8a and 8b are covered with the resin 15, but they need not be covered.

In FIG. 1, the drive circuit, which energizes the coils 7 so as to drive the motor, has connection terminals 11a, which are projected from the base 11 of the drive circuit. Further, lead terminals 11b, to which coil leads 7a extended from the coils 7 are electrically connected, are also projected from the base 11. The connection terminals 11a and the lead terminals 11b are integrated with the base 11 of the drive circuit by, for example, insert molding. In the present embodiment, the four stator units 9a-9d (2 phases×2) are stacked, so four pairs of the lead terminals 11a are formed to connect the coil leads 7a.

The coil leads 7a, which are extended from the inner side of the coil of each of the stator units 9a-9d to the outer side thereof, are electrically connected to the lead terminals 11b of the base 11 via a space between the outer circumference of the coil and inner faces of the magnetic pole teeth (claw poles) 8c and 8d of the stator yokes 8a and 8b, so that each of the stator units 9a-9d can be electrically connected to the lead terminals 11b.

Next, the structure of each of the stator units 9a-9b will be explained. The stator units 9a-9b have the same structure, so one of the stator units will be explained. In FIG. 1, the coils 7, which are formed by winding magnetic wires, are respectively attached to a plurality of bobbins, which are provided to the bearing housing 10 and arranged in the axial direction thereof. The bobbins are formed by fitting ring-shaped stator guide plates 16, which have been insulation-coated, on the outer circumference of the bearing housing 10, which rotatably holds the output shaft 5.

Figure 2:
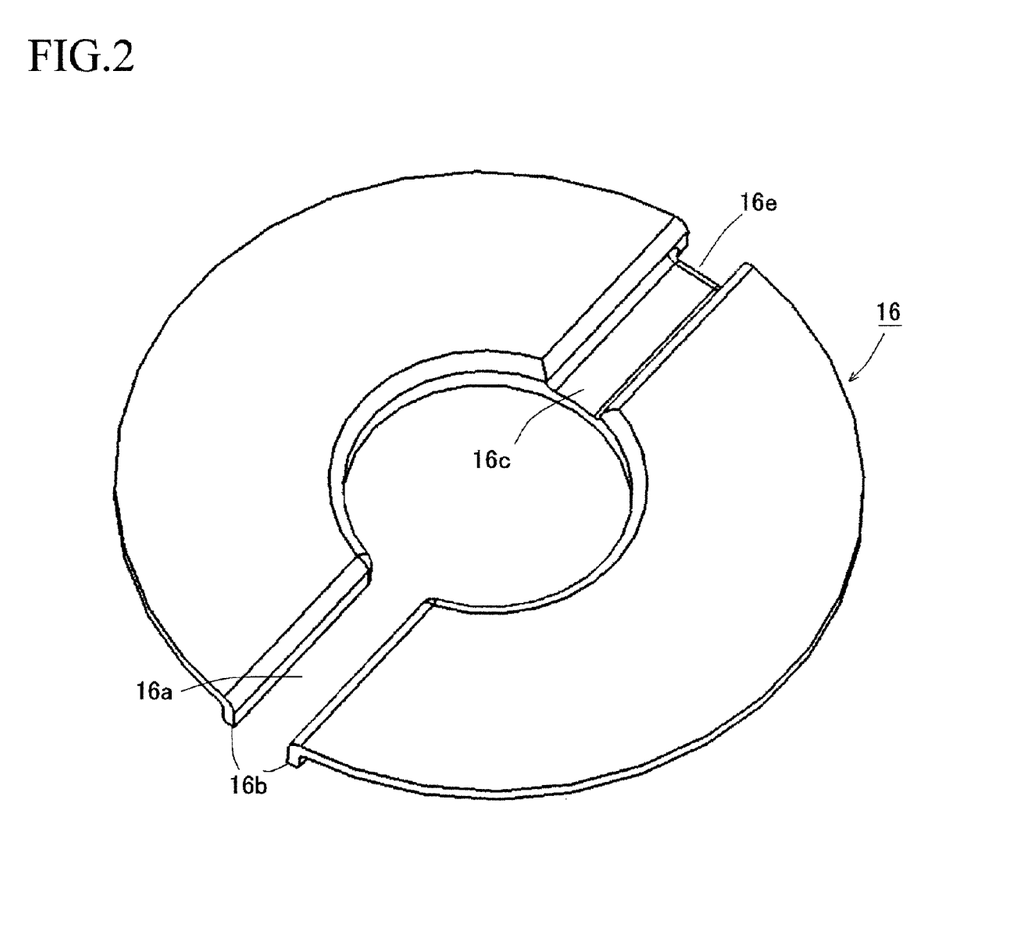
FIG. 2 is a perspective view of a stator guide plate shown in FIG. 1.

As shown in FIG. 2, each of the ring-shaped stator guide plates 16 includes a slit 16a, which are radially formed from the inner side to the outer side, and erecting walls 16b, which are projected from edges of the slit 16a in the axial direction and radially formed from the inner side to the outer side. A guide section 16c is formed like a gate and located on the radially opposite side to the slit 16a. The guide section 16c is radially formed from the inner side to the outer side. A notch 16e is inwardly formed at the radially outer end of the guide section 16c. The coil leads 7a can be wired, in a gap between the outer circumference of the coil and the magnetic pole teeth 8c and 8d of the stator yokes 8a and 8b, in the longitudinal direction of the bearing housing 10, via the notch 16e. Surfaces of the stator guide plate 16 are coated with insulation films.

The uppermost pair of stator guide plates 16 shown in FIG. 3 will be explained. In the upper stator guide plate 16, the erecting walls 16b and the guide section 16c are projected upward. On the other hand, the lower stator guide plate 16 is inverted 180°, so the erecting walls 16b and the guide section 16c are projected downward. Similarly, other pairs of the stator guide plates 16 are attached to the bearing hosing 10, so the four pairs of (eight) stator guide plates 16 are arranged in the axial direction of the bearing housing 10. The convex face of the guide section 16c contacts the erecting walls 16b of the adjacent stator guide plate 16. With this structure, a wiring space, from which the coil leads 7a are extended outward, is formed by the groove 16d of the guide section 16c and the notch 16e and the erecting walls 16b. The coil leads 7a are extended, in the radial direction, from the inner side of the coil 7 to the outer side thereof, through the groove 16d, and the coil leads 7a are bent and further extended, via the notch 16e and the space between the erecting walls 16b, to the outer circumference of the adjacent coil 7. Note that, the erecting walls 16b of the lowermost stator guide plate 16 contact the base 11, so the wiring space is formed by the groove 16d surrounded by the erecting walls 16b and the upper face of the base 11.

Figure 3:
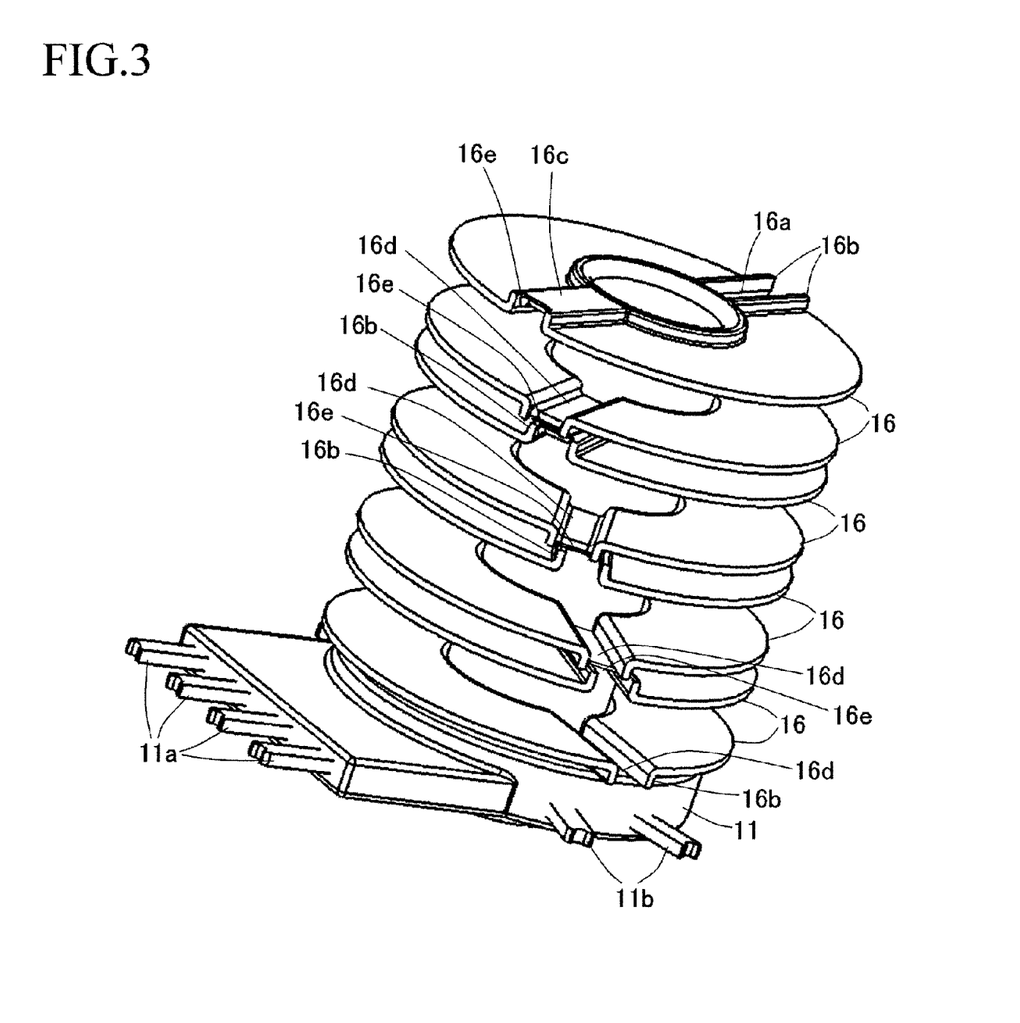
FIG. 3 is a perspective view in which the stator guide plates are attached to a bearing housing.
Figure 4:
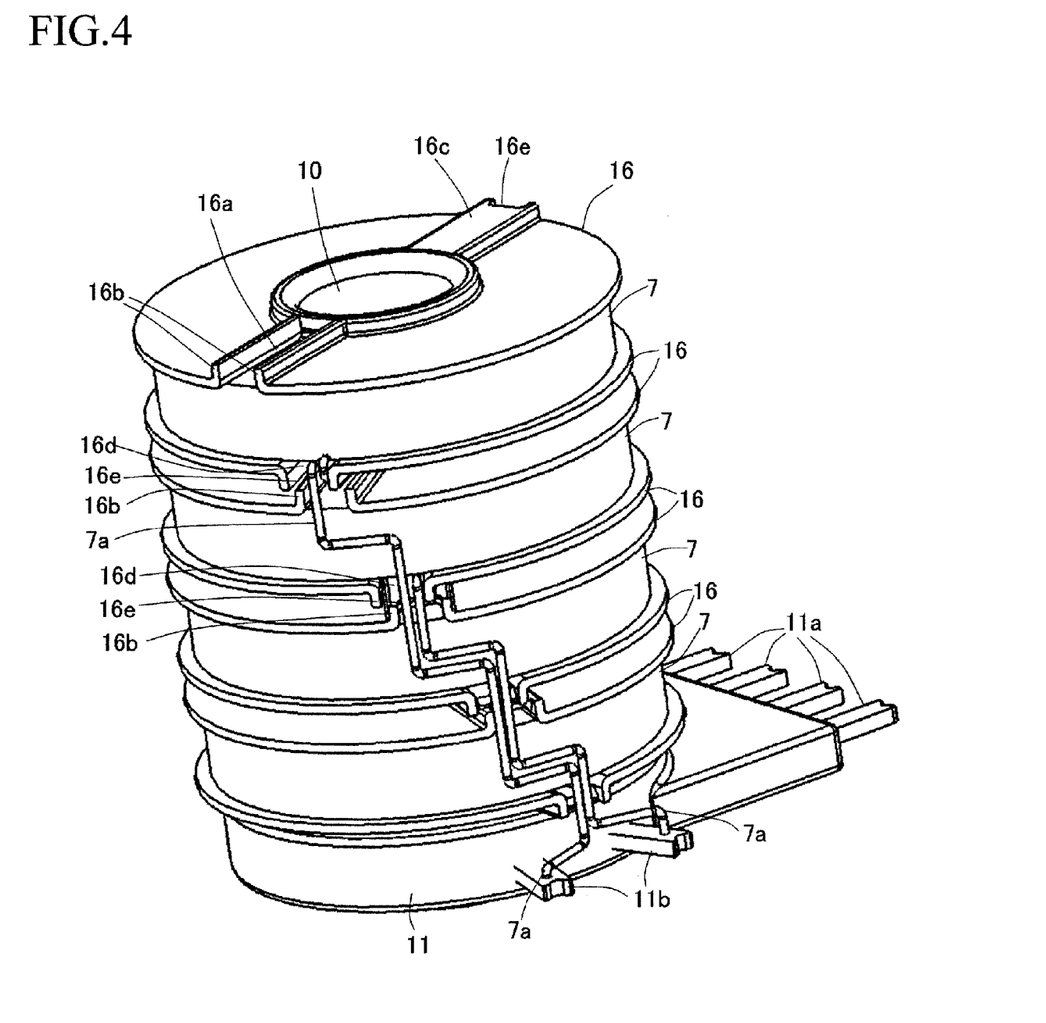
FIG. 4 is a perspective view in which coils are formed between the stator guide plates shown in FIG. 3.

As shown in FIG. 3, the grooves 16d, which are respectively formed in the stator units, are shifted in the circumferential direction. Thus, as shown in FIG. 4, the coil leads 7a which are extended from the inner side of the uppermost coil 7 to the outer side via the groove 16d are wired in a gap between the outer circumference of the second coil 7 and the magnetic pole teeth 8c and 8d thereof through the notch 16e, they are further extended and wired in a gap between the outer circumference of the third coil 7 and the magnetic pole teeth 8c and 8d thereof through the notches 16e and the erecting walls 16b of the adjacent stator guide plates 16 constituting the second bobbin and the third bobbin, they are further extended and wired in a gap between the outer circumference of the fourth coil 7 and the magnetic pole teeth 8c and 8d thereof through the notches 16e and the erecting walls 16b of the adjacent stator guide plates 16 constituting the third bobbin and the fourth bobbin, and they are electrically connected to the lead terminals 11b of the base 11 through the notch 16e of the lowermost stator guide plate 16.

The coil leads 7a which are extended from the inner side of the second coil 7 to the outer side via the groove 16d are wired in the gap between the outer circumference of the third coil 7 and the magnetic pole teeth 8c and 8d thereof through the notch 16e, and they are finally connected to the lead terminals 11b of the base 11. The coil leads 7a of the third and fourth coils 7 are also connected to the lead terminals 11b of the base 11 by the same manner.

Figure 5:
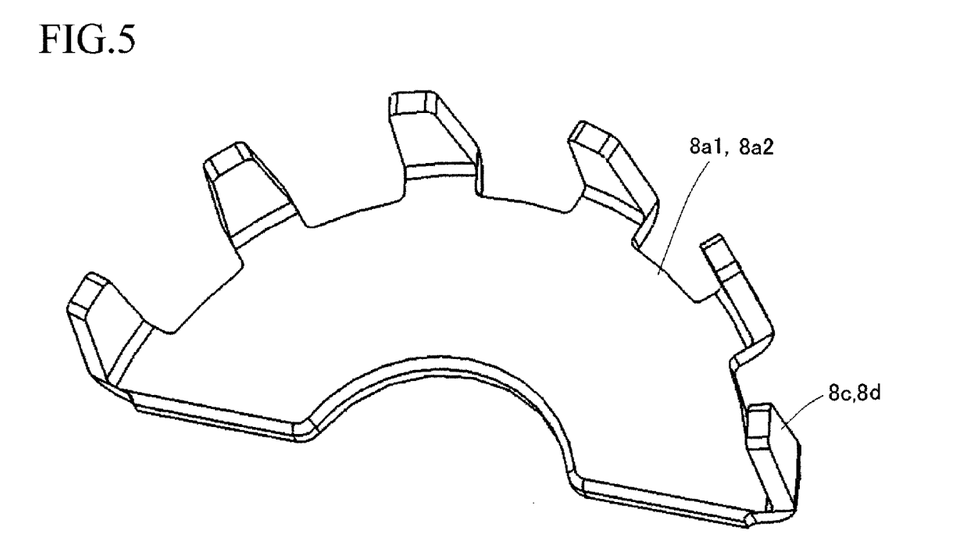
FIG. 5 is a perspective view of a yoke part.

FIG. 5 shows a yoke part 8a1 of the stator yoke 8a which can be divided into two yoke parts 8a1 and 8a2. As shown in FIG. 1, each pair of the stator guide plates 16, between which the coil 7 is wound, is sandwiched between the stator yokes 8a and 8b. In each of the stator yokes 8a and 8b, the comb-shaped magnetic pole teeth 8c and 8d are formed, in the circumferential direction, with a prescribed phase difference. Surfaces of the stator yokes 8a and 8b are coated with insulation films, and the insulation films may be formed by applying paint. In case that the stator yokes 8a and 8b are not coated with insulation films, it is preferable that the coil leads 7a are further coated with the insulation films, which are different from ordinary insulation films coating the magnet wires, or that the coil leads 7a are covered with insulation members, e.g., plastic tubes, so as to secure reliability.

As shown in FIG. 1, circumferential ends of the yoke parts 8a1 and 8a2 contact the erecting walls 16b and the guide section 16d, and the magnetic pole teeth 8c and 8d are attached on the outer circumference of the coil 7 in such a way that they are engaged with each other. The yoke parts 8a1 and 8a2 are integrated, in the circumferential direction, by welding, bonding or press fit.

Figure 6:
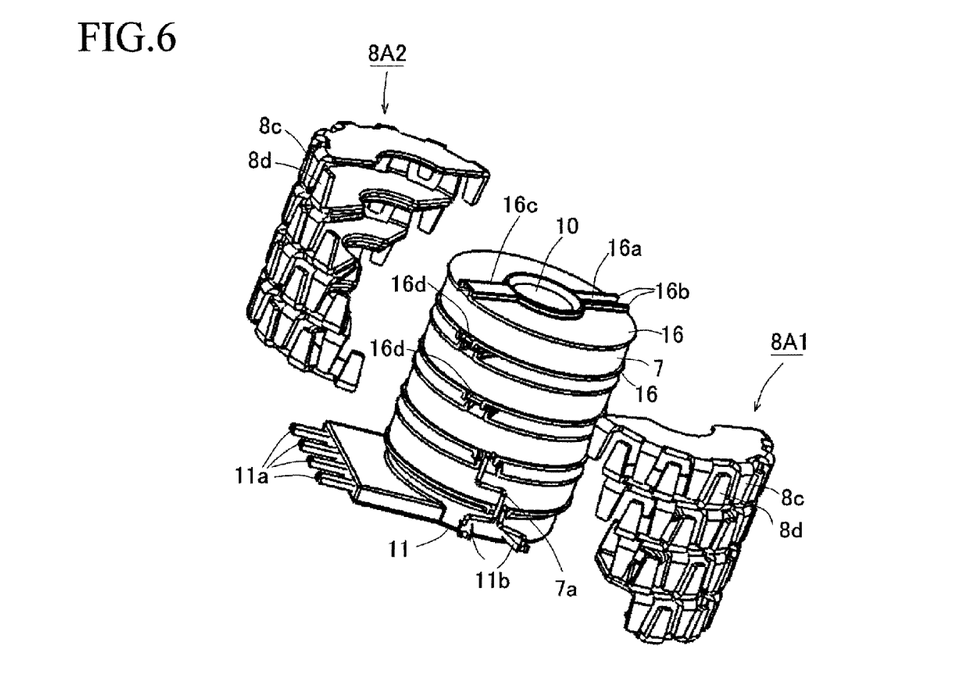
FIG. 6 is a perspective view in which the stator guide yokes are detached from circumferences of the coils shown in FIG. 4.

The stator yokes 8a and 8b may be attached in each of the stator units 9a-9d. Further, as shown in FIG. 6, another type of yoke parts 8A1 and 8A2, in each of which a plurality of (e.g., four) yoke parts are integrated, may be employed.

By employing the yoke parts 8a1, 8a2, 8A1 and 8A2, the yoke parts can be easily attached and correctly positioned with respect to the stator guide plates 16, so that efficiency of assembling the stator 6 can be improved.

To assemble the stator 6 as shown in FIG. 1, the bearing housing 10 is attached to the base 11 of the drive circuit, and then the stator guide plates 16 are fitted on the outer circumferential face of the bearing housing 10 in such a way that the guide section 16c of the stator guide plate 16 faces the slit 16a of the adjacent stator guide plate 16 as shown in FIG. 3. In each pair of the stator guide plates 16 (i.e., the third-fourth stator guide plates 16, the second-third stator guide plates 16 and the first-second stator guide plates 16), the guide section 16c and the erecting walls 16b are overlapped, so that the four bobbins can be formed.

As shown in FIG. 4, the coils 7 are respectively formed in the four bobbins, the coil leads 7a of the uppermost (first) coil 7 are extended from the inner side of the first coil 7 to the outer side via the groove 16d, they are further extended to the outer circumference of the second coil 7 via the notch 16e and the erecting walls 16b between the first and second stator guide plates 16, they are further extended via the notch 16e and the erecting walls 16b between the second and third stator guide plates 16, and they are finally connected to the lead terminals 11b of the base 11 of the drive circuit. Note that, a terminal end of the first coil 7 may be connected to a starting end of the second coil 7, and a terminal end of the third coil 7 may be connected to a starting end of the fourth coil 7.

Next, the yoke parts 8a1 and 8a2 are attached to each of the four bobbins, or the two yoke parts 8A1 and 8A2 shown in FIG. 6 are attached. The circumferential ends of the yoke parts 8a1, 8a2, 8A1 and 8A2 contact the erecting walls 16b and the guide sections 16c, and the yoke parts are integrated by welding, bonding or press fit.

Then, the outer circumferential face of the stator 6 and the base 11 of the drive circuit may be molded, in block, with resin. Note that, the outer circumferential face of the stator 6 may be firstly molded, and then the base 11 including the lead terminals 11*b* may be molded.

Note that, magnetic flux acting surfaces of the magnetic pole teeth 8*c* and 8*d* of the stator units 9*a*-9*d* need not be exposed. They may be exposed according to products, use application, etc. In case that the magnetic flux acting surfaces of the magnetic pole teeth 8*c* and 8*d* are exposed, gaps between the magnetic flux acting surfaces and the permanent magnet 2 are narrow, so torque can be easily increased. However, the molding resin will peel, and resin fins will be formed. On the other hand, in case that the magnetic flux acting surfaces of the magnetic pole teeth 8*c* and 8*d* are coated, torque cannot be easily increased but the molding resin will not peel and no resin fins will be formed.

With the above described stator structure, the coil leads 7*a* can be efficiently wired, in the small spaces between the stator units 9*a*-9*d*, without lowering lamination factors of the coils 7 and worsening insulation reliability between the coils 7 and the base 11 of the drive circuit.

A plurality of the stator units 9*a*-9*d* can be assembled by attaching the yoke parts 8*a*1 and 8*a*2, which can be formed into the ring shape, to the outer circumference of the bearing housing 10 after attaching the coils 7. Further, the coil leads 7*a*, which have been extended from the inner side of the coil 7 of each of the stator units 9*a*-9*d*, can be wired through a gap between the outer circumference of the adjacent coil 7 and the magnetic pole teeth 8*c* and 8*d* and connected to the base 11. Therefore, a plurality of pairs of the stator yokes 8*a* and 8*b* can be easily attached and the coil leads 7*a* can be easily wired, so that efficiency of assembling the stator can be improved.

Next, another embodiment of the outer rotor-type motor will be explained with reference to FIGS. 8 and 9. Note that, the structural elements described in the former embodiment are assigned the same symbols and explanation will be omitted. Unique points will be mainly explained.

In the present embodiment, a pair of ring-shaped guide plates 17*a* are attached to the outer circumference of the bearing housing 10 instead of the stator guide plates 16. The guide plates 17*a* are integrated by an inner connecting section 17*b* so as to form a bobbin 17. In the present embodiment, four bobbins 17A-17D are stacked. The coil 7 of the magnet wire is wound on each of the bobbins 17A-17D.

Figure 8:
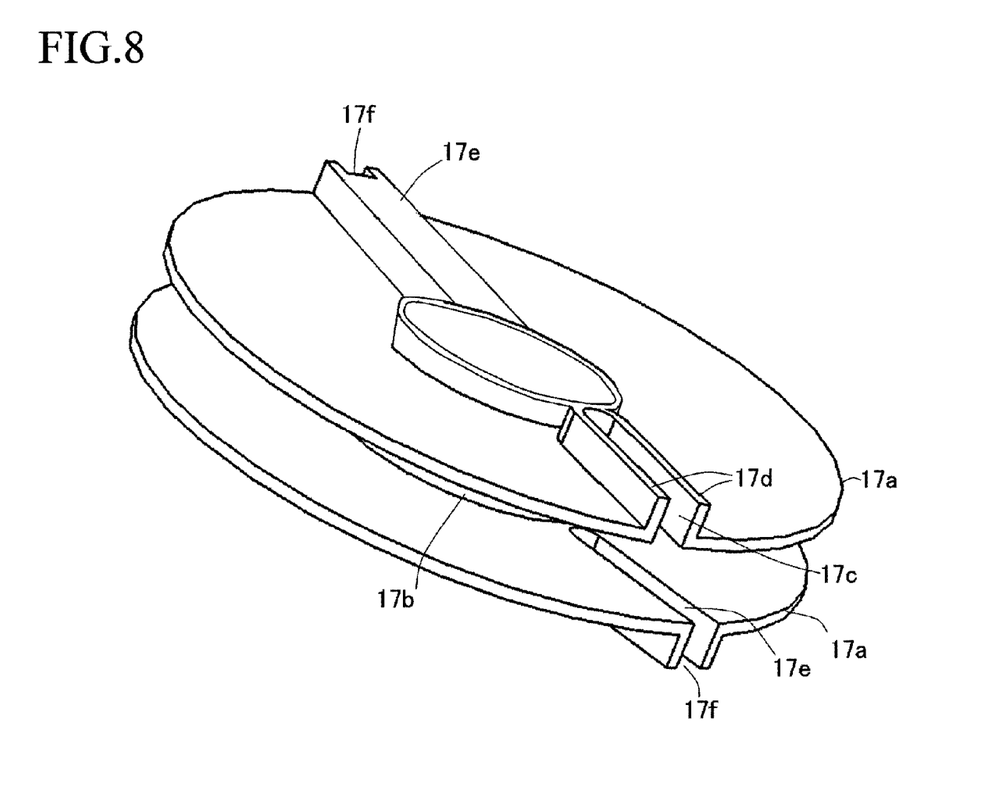
FIG. 8 is a perspective view of a bobbin of another embodiment, which is integrally molded with the stator guide plates.
Figure 9:
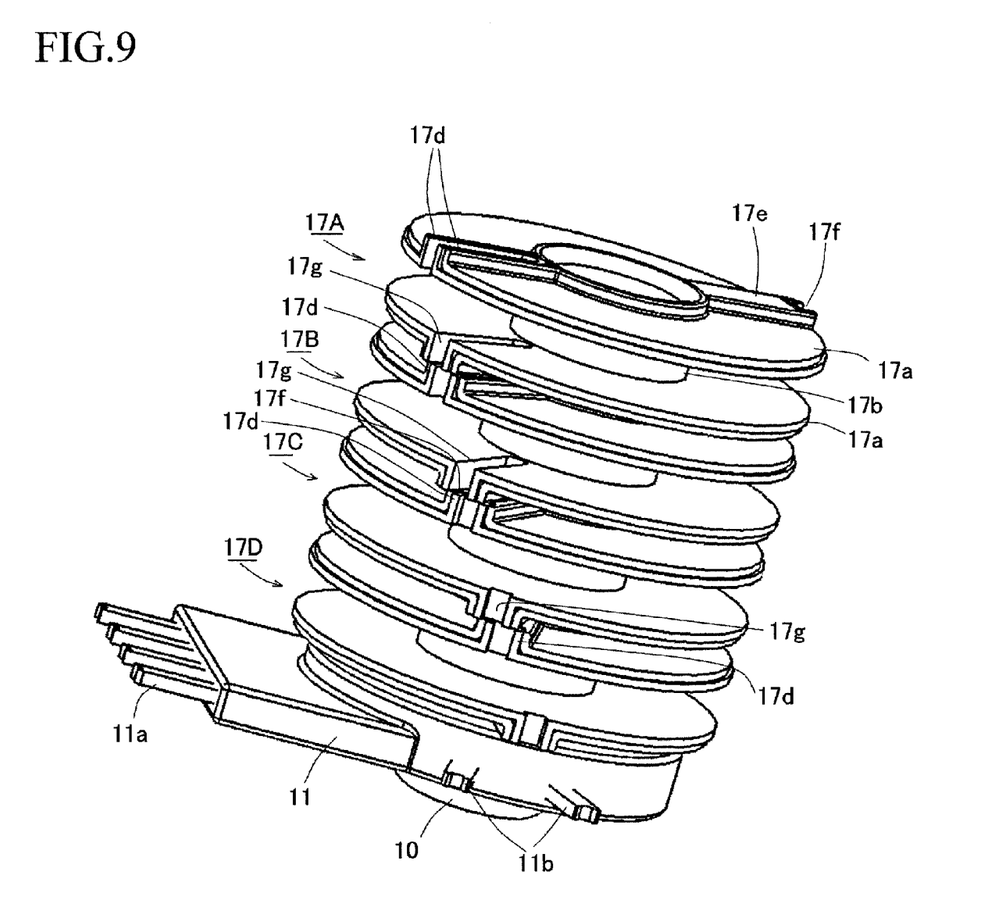
FIG. 9 is a perspective view in which the bobbins shown in FIG. 8 are attached to the bearing housing.

In FIG. 8, each of the ring-shaped guide plates 17*a* includes a slit 17*c* having erecting walls 17*d*, which are projected in the axial direction and continuously formed from the inner side to the outer side. A guide section 17*e*, which is formed like a gate, is located on the radially opposite side to the slit 17*c* and continuously formed from the inner side to the outer side. A notch 17*f* is formed at the outer end of the guide section 17*e*.

In a pair of the guide plates 17*a* of the integrated bobbin 17, the erecting walls 17*d* and the guide sections 17*e* are projected from the reverse side of facing surfaces. The guide plates 17*a* are mutually shifted 180° in the circumferential direction, so the erecting walls 17*d* of one guide plate 17*a* corresponds to the guide section 17*e* of the other guide plate 17*a*.

The bobbins 17A-17D are stacked and fitted on the outer circumference of the bearing housing 10 in a state where the erecting walls 17*e* and the guide sections 17 are overlapped. The coil leads 7*a* are wired in wiring spaces, each of which is formed by the notch 17*f* and a groove 17*g* of the guide section 17*e* and the erecting walls 17*d*. The coil leads 7*a* of the coil 7 wound on each of the bobbins 17A-17D are extended, from the inner side to the outer side, via the groove 17*g*, and wired on the outer circumference of the adjacent coil 7 through the notch 17*f* and the erecting walls 17*d*, as well as the former embodiment.

The claw pole-type two-phase stepping motors are explained in the above described embodiments. The present invention is not limited to the embodiments. The present invention may be applied to, for example, multi-phase (e.g., three-phase, four-phase, . . . n-phase) stepping (blushless) motors, whose axial directions are elongated to dampen vibration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. An outer rotor-type motor, comprising:
    a stator being constituted by a plurality of stator units, which are concentrically stacked around a bearing section and in each of which an air-core coil formed by winding a magnet wire is sandwiched between stator yokes having comb-shaped magnetic pole teeth;
    an output shaft being pierced through the bearing section;
    a rotor having a rotor yoke, which includes a permanent magnet having magnetic poles facing the magnetic pole teeth and which is capable of rotating together with the output shaft;
    lead terminals of a driving circuit for energizing the coils to drive the motor;
    a plurality of stator guide plates, which are formed into a ring shape and insulation-coated, are fitted on an outer circumference of a bearing housing, which is formed into a cylindrical shape and capable of rotatably holding the output shaft, to form a plurality of bobbins in the axial direction, the coils, which are formed by winding the magnet wires, are respectively attached to the bobbins, and the coil leads are extended toward outside of the adjacent coils via a wiring space formed from the inner side of each of the stator guide plates to the outer side thereof; and
    coil leads, which are extended outward from the inner side of each of the coils via a gap between the outer circumference of the coil and the magnetic pole teeth, are electrically connected to the lead terminals,
    wherein each of the stator yokes is formed into a ring shape and constituted by a plurality of yoke parts, the stator yokes, which are formed by combining the yoke parts, surround outer circumferences of the coils,
    each of the stator guide plates includes: a slit having erecting walls, which are continuously formed from the inner side to the outer side; a guide section being located on the radially opposite side to the slit, the guide section being projected in the same direction as the erecting walls are projected; and a notch being formed at the outer end of the guide section, and
    the coil leads are extended outward via a groove, which is formed by overlapping the guide section and the erecting walls of the adjacent stator guide plate, and the coil leads are wired along the outer circumference of the adjacent coil via the notch and the erecting walls.

2. The outer rotor-type motor according to claim 1, wherein the grooves of the adjacent stator units are shifted in the circumferential direction.

3. The outer rotor-type motor according to claim 1 or 2, wherein the circumferential ends of the yoke parts contact the erecting walls and the guide section of each of the stator guide plates, the magnetic pole teeth are attached on the outer circumference of the coil in such a way that they are engaged with each other, and the yoke parts are integrated, in the circumferential direction, by welding, bonding or press fit.

4. An outer rotor-type motor, comprising:

a stator being constituted by a plurality of stator units, which are concentrically stacked around a bearing section and in each of which an air-core coil formed by winding a magnet wire is sandwiched between stator yokes having comb-shaped magnetic pole teeth;

an output shaft being pierced through the bearing section;

a rotor having a rotor yoke, which includes a permanent magnet having magnetic poles facing the magnetic pole teeth and which is capable of rotating together with the output shaft; and lead terminals of a driving circuit for energizing the coils to drive the motor, coil leads, which are extended outward from the inner side of each of the coils via a gap between the outer circumference of the coil and the magnetic pole teeth, are electrically connected to the lead terminals; and a plurality of bobbins, each of which is formed by integral molding and constituted by a pair of ring-shaped guide plates whose inner connecting sections are connected to each other, are fitted on an outer circumference of a bearing housing and stacked thereon, the coil formed by winding the magnet wire is attached to each of the bobbins, the coil leads are extended to the outer circumference of the adjacent coil via a wiring space formed from the inner side of each of the guide plates to the outer side thereof, each of the stator yokes is formed into a ring shape and constituted by a plurality of yoke parts, the stator yokes, which are formed by combining the yoke parts, surround outer circumferences of the coils, wherein each of the stator guide plates includes: a slit having erecting walls, which are continuously formed from the inner side to the outer side; a guide section being located on the radially opposite side to the slit, the guide section being projected in the same direction as the erecting walls are projected; and a notch being formed at the outer end of guide section, the coil leads are extended outward via a groove, which is formed by overlapping the guide section and the erecting walls of the adjacent stator guide plate, and the coil leads are wired along the outer circumference of the adjacent coil via the notch and the erecting walls.

5. The outer rotor-type motor according to claim 4, wherein the grooves of the adjacent stator units are shifted in the circumferential direction.

6. The outer rotor-type motor according to claim 4 or 5, wherein the circumferential ends of the yoke parts contact the erecting walls and the guide section of each of the stator guide plates, the magnetic pole teeth are attached on the outer circumference of the coil in such a way that they are engaged with each other, and the yoke parts are integrated, in the circumferential direction, by welding, bonding or press fit.

7. The outer rotor-type motor according to claim 1 or 4, wherein the stator is entirely molded.

\* \* \* \* \*